April 4, 1944.         E. E. WEMP                2,345,846
                       DRIVING AXLE
            Filed Jan. 23, 1943         3 Sheets-Sheet 1

INVENTOR.
Ernest E. Wemp
BY Barnes, Kisselle, Laughlin & Raisch
Attorneys.

April 4, 1944.　　　E. E. WEMP　　　2,345,846
DRIVING AXLE
Filed Jan. 23, 1943　　　3 Sheets-Sheet 2
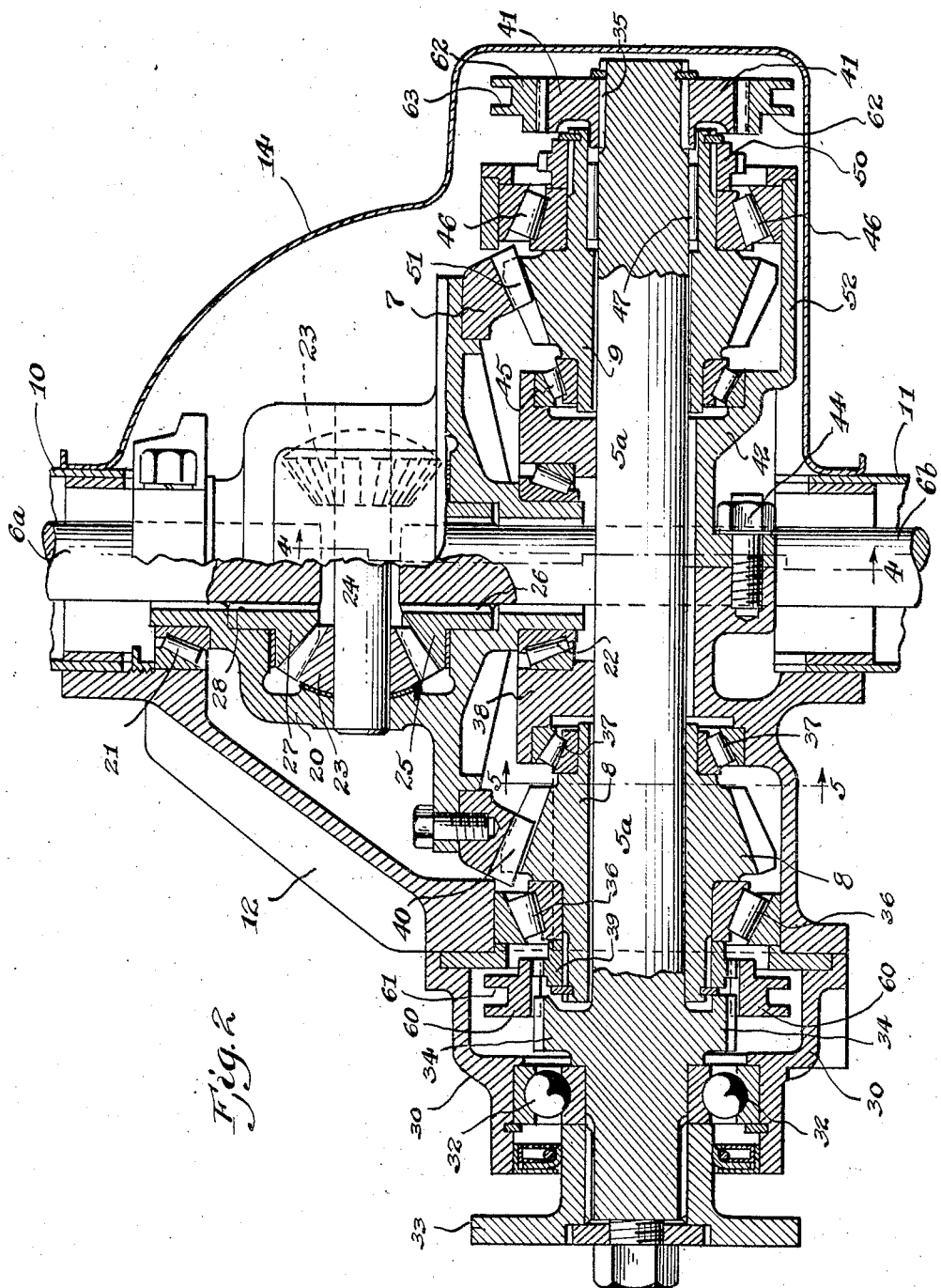
INVENTOR.
Ernest E. Wemp
BY Barnes, Kisselle, Laughlin & Raisch
Attorneys.

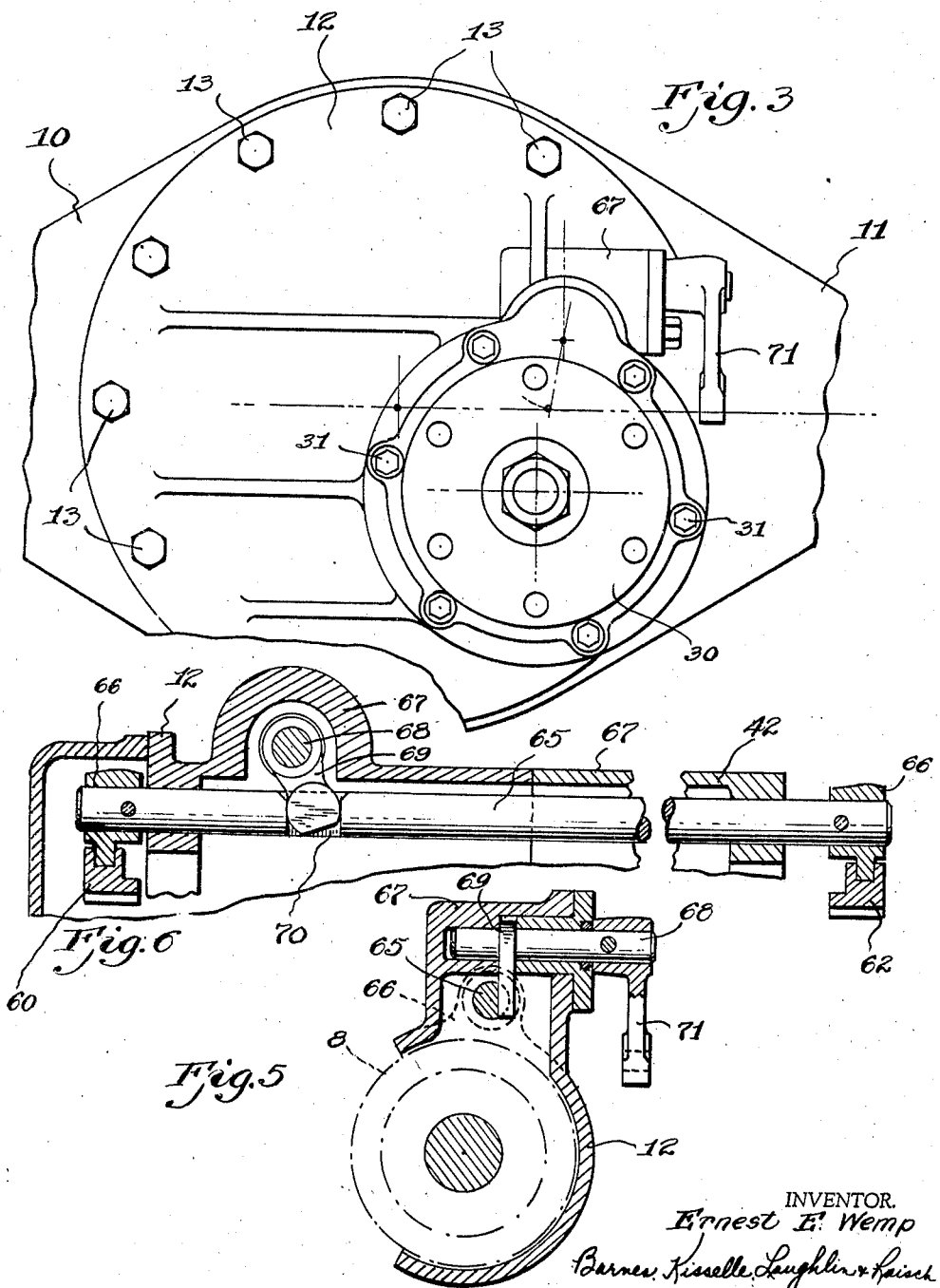

Patented Apr. 4, 1944

2,345,846

UNITED STATES PATENT OFFICE 2,345,846

DRIVING AXLE

Ernest E. Wemp, Detroit, Mich.

Application January 23, 1943, Serial No. 473,338

1 Claim. (Cl. 74—311)

This invention relates particularly to automotive vehicles and it has to do with a reversing arrangement so that the vehicle may be driven forwardly or reversely. The invention is concerned particularly with a combination of elements including a torque converter and a hypoid gear set, such as a driving axle, and wherein reversing mechanism is incorporated in the hypoid gearing.

As is well known, the internal combustion engine commonly used in automotive vehicles is not reversible and the power transmitted thereby, as for example, by a torque converter of the type shown in copending application Serial No. 460,795, filed October 5, 1942, is in one direction of rotation only. Accordingly, some form of reversing means is necessary so that the vehicle may be propelled both forwardly and backwardly. The hypoid axle is generally known to those versed in the art as one where the pinion which drives the ring gear of the axle is located below a substantially horizontal diametral line through the ring gear of the axle. In other words, the axis of the pinion and the propeller shaft where it connects to the pinion are located below the center line of the axle shaft. One advantage of this is to permit lowering the vehicle frame and thus a lowering of the center of gravity.

In accordance with this invention a novel axle construction of the hypoid type is provided by means of which the direction of rotation imparted to the axle shaft may be reversed for forward and reverse movements. Accordingly, where a torque converter, as for example, of the type shown in the above mentioned application, is used in a vehicle with an internal combustion engine, no separate reversing means or reversing gears need be employed where the reversing axle construction of this invention is employed. The hypoid gearing, such as an axle, for example, has a construction which lends itself advantageously to the provision of the reversing arrangement and this construction particularly resides in the fact that the axis of the pinion is out of line with the axle shaft and, therefore, the propeller shaft may be extended beyond the pinion to substantially the opposite side of the ring gear, such extended shaft passing under the drive shaft of the axle. Accordingly, a second connection may be made between the propeller shaft and the ring gear.

While it has been stated that the invention relates particularly to automotive vehicles and that a hypoid axle is known to those in the art as one where the axis of the driving pinion is located below the axis of the axle shaft, the invention is not necessarily limited to an automotive vehicle or to a hypoid axle. In other words, the invention may be used for the transmission of power in other mechanism, and in so far as the hypoid gearing is concerned, the parts could be reversed so that the axis of the pinion would lie above or to one side of a diametral plane through a ring gear. Accordingly, while it is convenient to disclose the invention as it is related to an automotive vehicle, it will be seen that it is not limited thereto.

One construction for carrying out the invention is shown in the accompanying drawings, and in these drawings:

Fig. 2 is a horizontal cross sectional view taken through an axle constructed in accordance with the invention.

Fig. 3 is an elevational view looking at the construction from the left hand side of Fig. 2.

Fig. 5 is an ensmalled sectional view illustrating control elements, this view being taken substantially on line 5—5 of Fig. 2.

Fig. 6 is a view of control mechanism taken substantially on line 6—6 of Fig. 5.

Figure 4:
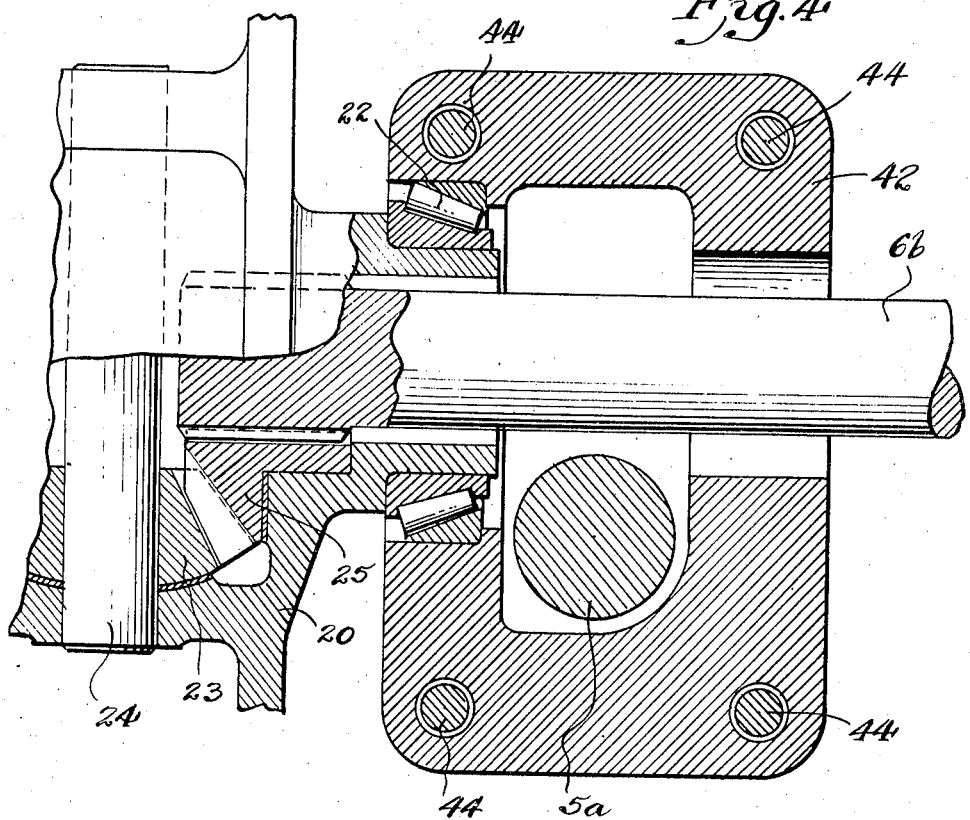
Fig. 4 is an enlarged cross sectional view taken substantially on line 4—4 of Fig. 2, looking in the direction of the arrows.
Figure 1:
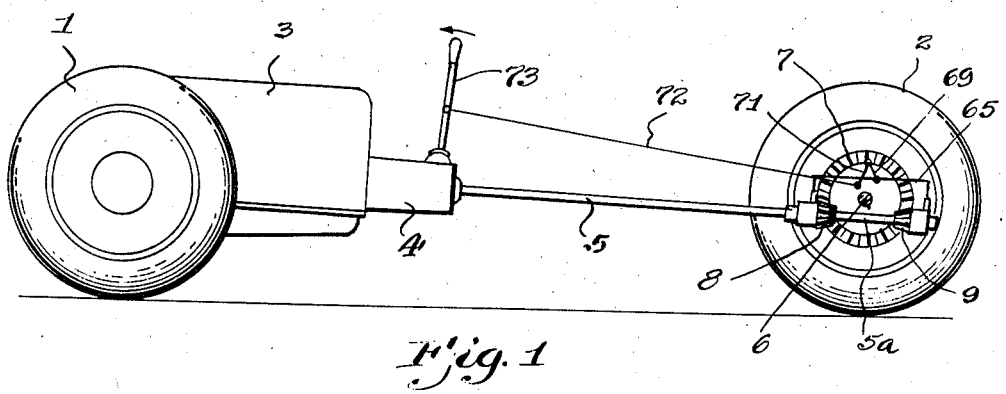
Fig. 1 is a diametrical view illustrating part of a chassis of a vehicle showing the engine, torque converter, propeller shaft and axle construction.

By reference first to Fig. 1, it will be seen that there is a diagrammatic illustration of an automotive vehicle comprising front wheels 1, rear wheels 2 and an engine 3. A torque converter is shown at 4 for providing variable torque and speed ratios between the engine and the propeller shaft 5. The rear axle shaft is shown at 6, the same being provided with a beveled ring gear 7, and this construction is shown as being of the hypoid type, there being a pinion 8 with its teeth meshing with the ring gear, while the propeller shaft extends as at 5a across the ring gear underneath the axle shaft. The parts 5 and 5a of the propeller shaft may be integral or may be separate elements connected for rotation in unison.

In Fig. 2 the details of the construction of the axle and reversing mechanism are shown. The two halves of the axle shaft are shown at 6a and 6b, disposed in the tubular parts 10 and 11 of the axle housing. A carrier in the form of a machined casting is generally illustrated at 12 (Fig. 3), and it is secured to the axle housing as by means of cap screws 13, as shown, for which purpose the axle housing is enlarged in its central portion in the usual fashion, as indicated, The carrier may close the forward opening in the housing, while a cover plate 14 may enclose the opening at the rear of the housing. This construction forms an enclosure and a support for the gearing and the axle shafts and propeller shaft.

The two axle shafts 6a and 6b are interconnected, through the means of differential gearing, to the ring gear of the axle. To this end an element, which may be also called a carrier, is illustrated at 20, journalled in the main carrier as at 21 and 22, and this element has attached thereto the ring gear 7. Pinions are shown at 23 and are rotatably mounted upon a stud 24 situated in the carrier 20. The shaft 6b is keyed at 26 to a beveled gear 25, while the axle shaft 6a is keyed to a beveled gear 27 as at 28, and the two beveled gears mesh with the pinions 23. This provides the usual differential between the two axle shafts, but there is this variation: The differential itself comprising the meshing pinions and beveled gears is located on the side of the ring gear opposite its toothed portion instead of in its usual position, which is on the toothed side of the ring gear. This construction is for the purpose of providing room for the propeller shaft 5a to extend transversely across the axle.

The propeller shaft, or propeller shaft part 5a, extends into the carrier or housing through a cap 30 bolted to the carrier 12 as at 31, and it is journalled in the cap as at 32. It has a flange 33 by means of which it can be connected to the propeller shaft part 5. The propeller shaft has a toothed member which may be considered a clutch member, as shown at 34, and this member may be integral with the shaft, while at the opposite end, i. e., the end opposite the flange 33, it is provided with a toothed clutch member 41 which may be keyed or splined to the shaft as at 35. The hypoid pinion 8 is journalled in the carrier 12 as by means of an anti-friction bearing 36 and an anti-friction bearing 37. The carrier 12 has an intermediate web construction 38. The pinion 8 has a toothed clutch member 39 disposed in facing relationship with the clutch member 34 on the propeller shaft 5a. The member 39 may be a separate piece keyed or splined to the pinion 8, as shown. The teeth of the ring gear 7 mesh with those of the pinion 8, as illustrated at 40. The apparent misalignment of this dental engagement is due to the fact that the section of the ring gear is through the axle shaft, whereas the actual location of the dental engagement is below the plane of the section.

There is an auxiliary support or carrier member 42 which is bolted to the carrier 12, as at 44, and indeed, this auxiliary support 42 serves partially to support the bearing 22, and the propeller shaft 5a projects through this part of the carrier. The pinion 9 is free of the shaft 5a, and it is journalled in the carrier part 42 by bearings 45 and 46. The propeller shaft 5a may be piloted within the pinion, as by means of a needle bearing 47, while the end thereof projects for the reception of the clutch member 41. Mounted on the pinion 9 is a toothed clutch member 50 in a position facing the toothed clutch member 41. The teeth of the pinion 9 and of the ring gear 7 mesh with each other, and the apparent misalignment of this fit, as shown at 51, occurs for the same reason as the dental engagement 40 with the pinion 8.

The carrier is formed and cut away, as shown in Fig. 5, so that the teeth of the pinion 8 are exposed for meshing with those of the ring gear, and the wall 52 of the carrier part 42 is likewise cut away to expose the teeth of the pinion 9 so that they may mesh with those of the ring gear. Accordingly, it will be observed that the propeller shaft is provided with two pinions, both of which mesh with the ring gear of the axle, but both of which are independently rotatable as regards each other and regards the propeller shaft. The toothed clutch members 34 and 41 on the propeller shaft and the toothed clutch members 39 and 50 on the pinions 8 and 9, respectively, provide means for coupling the shaft to one pinion or the other, and this is accomplished by a shiftable clutch means under the control of an operator. The arrangement is that the propeller shaft may be disconnected from both pinions, thus providing a neutral or non-driving condition.

An internally toothed clutch member 60 having a groove 61 is associated with the clutch members 34 and 39, and its internal teeth are arranged to have dental engagement with those of the clutch members. A second shiftable clutch member 62 having a groove 63 is associated with the clutch members 41 and 50. The two shiftable clutch members have common control means and which control means keeps the two members accurately spaced relative to each other. As shown in Fig. 6, a control rod 65 is mounted for axial shift in bearings provided in the two housing parts 12 and 42, and attached to each end of the rod is a shoe 66, each having a portion which fits into the groove of one of the shiftable clutch members. For the purposes of shifting the control rod, the carrier 12 may be provided with an enlargement 67 in which a stub rock shaft 68 is journalled. This rock shaft carries an arm 69, the head of which is suitably fashioned so as to engage in a slot 70 in the rod. Rocking of the shaft 68 causes a swinging of the arm 69 and a shift of the control rod. Suitable means are provided for controlling the movements of the rock shaft, and, as shown herein, this may be control arm 71 mounted upon the exposed end of the rock shaft. The control is, of course, preferably manipulated from an advantageous position, and, as diagrammatically illustrated in Fig. 1, a rod 72 connects to the arm 71 and extends to a convenient position where it may be connected to a lever or the like, as shown at 73. This control is diagrammatically shown, as are the remaining portions of Fig. 1.

With the parts positioned as shown in Fig. 2, the propeller shaft 5a is connected in driving relationship with the pinion 8 through the clutch members 34, 60 and 39. Therefore, rotation of the drive shaft will cause the pinion 8 to rotate in unison therewith, and the power is transmitted through the ring gear and the differential to the two axle shafts 6a and 6b. At this time the clutch member 62 is positioned so that it is connected only with the clutch member 41, and, therefore, the pinion 9 is not connected to the shaft 5a. This arrangement preferably gives the forward drive condition, which is the condition under which the vehicle is operated the majority of the time. The pinion 9 will rotate in a direction reverse to that of the pinion 8 during the forward driving of the vehicle, but there is no load on the pinion 9, and it freely idles in its bearings 45 and 46, and there is a freedom of movement between the propeller shaft and the shaft 9 due to the bearing 47.

If the shaft 65 be shifted to the extreme left position, the clutch member 60 will be shifted out of engagement with the member 31, and the clutch member 62 will be shifted into engagement with the clutch member 50. Now the pinion 8 is free of the propeller shaft, but the pinion 9 is connected to the propeller shaft through the clutch elements 41, 62 and 50. Therefore, with the same direction of rotation of the propeller shaft, the ring gear 7 will be driven in the reverse direction. An intermediate or neutral position can be had by shifting the coupling elements 60 and 62 to the left from the position shown in Fig. 2 and stopping at a point where the member 60 is disconnected from the clutch member 39 and where the member 62 has not yet coupled to the member 50. Under these circumstances, the propeller shaft 5a may rotate, but both pinions may remain at rest. It will be understood that the shifting to establish and to break these dental engagements will preferably be made substantially in the absence of torque. Usually no change is made from forward to reverse, or vice versa, except when the vehicle is at rest.

A further advantage of the construction is that the axial thrust on the pinions is taken by the large bearings 36 and 46. When the pinion 8 is coupled to the ring gear, the bearing 36 takes the thrust when torque is transmitted to the ring gear. When the pinion 9 is connected to the ring gear for reverse, the bearing 46 takes the thrust. Thus, the bearing 37 is required to take no load thrust, since the reverse drive is not transmitted through this pinion.

I claim:

A driving axle for an automotive vehicle comprising, an axle housing having two tubular housing parts and an intermediate enlarged housing part, the intermediate enlarged part having a forward opening, aligned axle shafts in the two tubular housing parts, a sub-assembly comprising a carrier member, a unit including a ring gear of the hypoid type and a differential gear set journalled in the carrier member, a pinion journalled in the carrier member having teeth meshing with those of the ring gear, a second pinion journalled in the carrier having teeth meshing with those of the ring gear, said pinions being positioned to engage the ring gear on opposite sides of its axis, said pinions being disposed on the same axis and being of the hypoid type so that the projection of their axes is disaligned relative to the axes of the two axle shafts, a drive shaft rotatably mounted in the carrier member and extending rotatably through the two pinions on their axes and crossing the line of axis of the axle shafts, clutch means associated with each pinion and the drive shaft, control means mounted on the carrier member and operable on the clutch means to selectively connect one pinion to the drive shaft and disconnect the other pinion from the drive shaft, said sub-assembly adapted to be passed into the forward opening of the enlarged housing part and the carrier member adapted to be secured to the enlarged housing part to close the forward opening and to position the axis of the ring gear on the axis of the two axle shafts and means connecting the two axle shafts to the differential gear set, one of the axle shafts crossing the driving shaft.

ERNEST E. WEMP.